F. LEDERER.
AUTOMOBILE BUMPER.
APPLICATION FILED OCT. 26, 1916.
1,233,887.
Patented July 17, 1917.
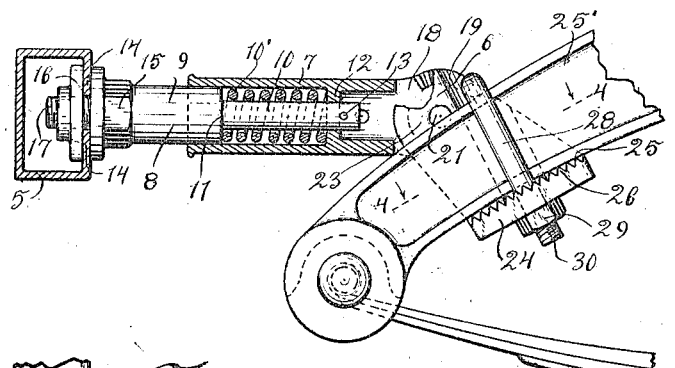
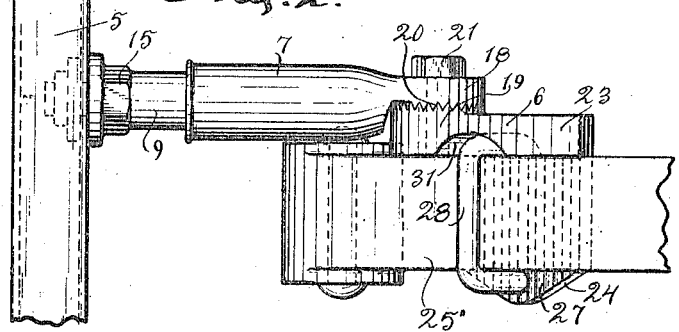
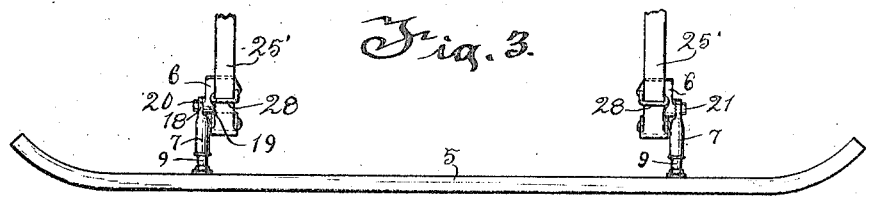
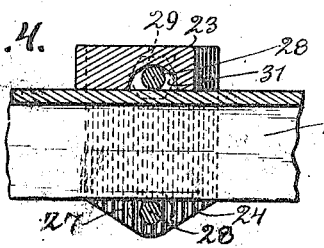
INVENTOR
Friedrich Lederer.
By Morsell, Keeney & French,
ATTORNEYS

UNITED STATES PATENT OFFICE.

FRIEDRICH LEDERER, OF MILWAUKEE, WISCONSIN, ASSIGNOR, BY DIRECT AND MESNE ASSIGNMENTS, TO MILWAUKEE AUTO ENGINE & SUPPLY COMPANY, A CORPORATION OF WISCONSIN.

AUTOMOBILE-BUMPER.

1,233,887.  Specification of Letters Patent.  Patented July 17, 1917.

Application filed October 26, 1916. Serial No. 127,782.

*To all whom it may concern:*

Be it known that I, FRIEDRICH LEDERER, a citizen of the United States, and resident of Milwaukee, in the county of Milwaukee and State of Wisconsin, have invented new and useful Improvements in Automobile-Bumpers, of which the following is a description, reference being had to the accompanying drawings, which are a part of this specification.

The invention relates to automobile bumpers.

The invention is more particularly designed to provide a means for attaching the bumper to an automobile by the use of brackets and clamping means which fit against and are clamped to the frame without drilling or cutting the frame or side bars of the automobile.

The invention is further designed to provide a bumper bracket of simple, yet efficient construction, consisting of an angled member embracing one side and the bottom of the side bar, and secured in place by clamping means passing around the side bar.

The invention further consists in the several features hereafter set forth and more particularly defined by claims at the conclusion hereof.

In the drawings;

Figure 1 is a view of the device embodying the invention, parts being broken away and parts being shown in section;

Fig. 2 is a detail plan view, parts being broken away;

Fig. 3 is a plan view showing the device attached to the side bars of an automobile;

Fig. 4 is a section taken on the line 4—4 of Fig. 1.

In general the device comprises a bumper bar 5, right and left supporting brackets 6, and means for yieldingly connecting said bar to said brackets.

The means for yieldingly connecting the bar 5 to the brackets 6 consists of tubular supporting arms 7 vertically adjustably connected to the brackets, slidable rods or plungers 8 having portions 9 and 10 fitting within the tubular arms 7, an adjustable connection between the rods 8 and bar 5, and a yielding connection between each rod 8 and arm 7 consisting of a spring 10' surrounding the portion 10 of the rod 8 and interposed between the shouldered portion 11 of said rod and an annular flange 12 in the tubular member, the outward movement of the rod 8 being limited by a pin 13.

The adjustable connection between the rods and the bar and the form of the bar may be of any desired form but I prefer to use a channel bumper bar provided with inwardly extending flanges 14 which are clamped to the arms by means of a wrench engaging portion 15 formed on the arm adjacent the outside of the flanges 14 and a nut 16 having threaded engagement with the threaded portion 17 of the arm, the flanges 14 being clamped between the portion 15 and nut 16. This manner of adjustably connecting the bar to the arms provides a bar with a smooth, contacting surface so that objects may be readily deflected from it if they strike at an angle and produces a neat appearing construction due to the connection being located behind the bar.

The adjustable connection between the arm 7 and its bracket 6 consists of contacting portions 18 and 19 on the solid rear end of the arm 7 and the upper end of the bracket 6 respectively, said portions having interengaging serrations 20 adapted to be brought into contact with each other by means of a pivotal clamping bolt 21 whereby the arm 7 may be adjusted so as to allow the bar 5 to extend in front of the vehicle in proper horizontal position.

The particular feature of the present invention however resides in the kind of brackets and clamping means therefor which enables the bumper to be readily attached and yieldingly supported upon an automobile so that the shock of impact will be transmitted to the side bars 27 thereof.

Each bumper bracket 6 comprises an angled member having an upright portion 23 adapted to engage or rest against the side of the side bar of the automobile and a laterally extending portion 24 adapted to engage against the underside 25 of the side frame member or bar 25' and having its engaging surface 26 curved to conform to the gaging surface 26 curved to conform to the general curvature of said side bar and provided with a plurality of transversely extending toothed ribs or serrations 27 adapted to firmly grip the under side 25 of the side bar when the bracket is clamped thereto.

The means for clamping the bracket 6 in position on the forward portion of the side bar comprises a U-bolt 28 whose transverse portion engages with the top side of the side bar and whose side portions engage both sides of the side bar and pass through apertures in the portions 24 of the bracket 6, said portion 24 being drawn up tightly against the under side of the side bar by tightening up the nuts 29 on the threaded ends 30 of the U-bolt against the under side of the portion 24 of the bracket 6. The upright portion 23 of the bracket 6 is provided with a lengthwise extending recess 31 adjacent the one side of the U-bolt so that a portion of the bracket abuts against the U-bolt to transmit the shock of impact from the bumper bar 5 and brackets 6 through the U-bolt 28 to the side bars.

In this construction when the bumper bar is subjected to shock, the yielding connection between the bar and the bracket will tend to absorb the shock and the shock of impact will be transmitted from the bracket through the clamping bolt to the side bar, a tensional strain being imposed upon the U-bolt 28, the serrated portion of the bracket gripping into the side bar, which is generally slightly tapered and thus forming a wedging engagement between the U-bolt and the bracket.

The brackets shown and described may be used in connection with any suitable buffer bar which may be rigidly or yieldingly connected to said brackets.

What I claim as my invention is:

1. A bumper bracket consisting of an angled member having an upright portion and a laterally extending portion adapted to be respectively disposed against a side and the bottom of the side frame member of an automobile, said laterally extending portion having apertures therein, and a U-bolt clamp disposed in line with the upright portion and fitting over the top and sides of the side bar and having its ends passing through the apertures in the bracket to secure the bracket to said side bar.

2. A bumper bracket consisting of an angled member having an upright portion and a laterally extending portion adapted to be respectively disposed against a side and the bottom of the side frame member of an automobile, said upright portion having a recess therein, said laterally extending portion having apertures therein, and a U-bolt fitting over the top and sides of the side bar and having one side disposed in the recess in said upright portion and its ends passing through the apertures in the bracket, and nuts for clamping the U-bolt and bracket to the side bar.

In testimony whereof, I affix my signature.

FRIEDRICH LEDERER.